Oct. 31, 1967  P. M. LEMOIGNE  3,350,036
HIGH-LIFT AIRCRAFT
Filed April 23, 1965
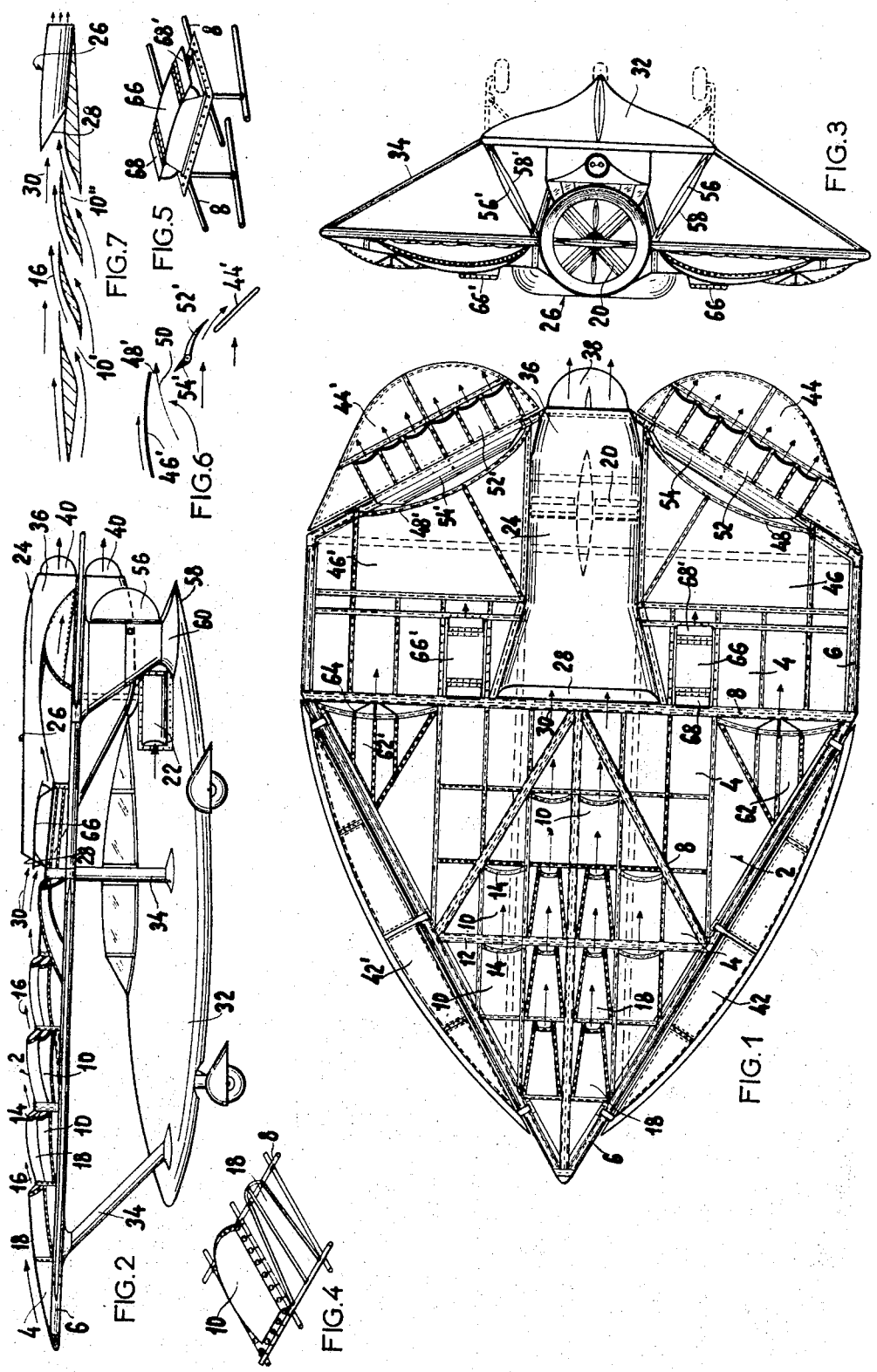

United States Patent Office 3,350,036
Patented Oct. 31, 1967

3,350,036
HIGH-LIFT AIRCRAFT
Pierre Marcel Lemoigne, 103 Ave. Verdier,
Montrouge, Seine, France
Filed Apr. 23, 1965, Ser. No. 450,403
Claims priority, application France, May 4, 1964,
973,195
8 Claims. (Cl. 244—35)

This invention relates to an aircraft having a fixed high-lift wing providing short-run take-off and landing and flight at low speed without loss of control and more particularly to aircraft of the kind comprising at least one fixed bearing surface and at least one engine which draws in air at the front-facing entry of a duct or shrouding and which delivers such air and/or a mixture thereof with some other gas at high speed through a rearwardly directed exit of the duct.

According to the invention, at least some of the bearing surface is formed with high-lift vents whose inlet opens on to the underside of the bearing surface and whose outlet opens on to the top of the baring surface and is directed substantially rearwardly of the aircraft with the entry of the duct being disposed above the top of the bearing surface and substantially at the level of such top behind the vent outlets so that when the engine is in operation its intake of air produces a forced air flow through the vents.

In one form of the invention, the duct is in the form of a shroud having a substantially cylindrical central portion in which at least one screw driven by an engine rotates, with the central portion being connected to a front progressively flattened part which extends to a shallow and very wide air intake at the level of the top of the bearing surface and to the rear of the vent outlets.

The invention provides on the top of the wing, independently of the speed of aircraft movement, a rearwardly directed air flow due to the suction action of the screw in the shrouding so that the high-lift vents become operative immediately the or each engine is in operation. The presence of a flat and very wide air intake at the level of the top of the bearing surface means that a wide thin stream of air can be aspirated over a considerable proportion of the bearing surface formed with the vents.

The aircraft according to the invention can comprise either a single engine disposed along the aircraft longitudinal axis or a number of engines disposed symmetrically thereof.

According to a feature of the invention, the central portion of the engine shrouding is prolonged by a convergent rearward part, and surfaces for vertical and horizontal control preferably being disposed in the convergent part or at least in the operative zone thereof so that such surfaces remain effective at reduced aircraft speeds.

The invention is illustrated by way of example in the accompanying drawings, in which:

FIGURE 1 is a plan view of an aircraft according to the invention;

FIGURE 2 is a view in side elevation of the same aircraft;

FIGURE 3 is a rear view of another form of the invention;

FIGURE 4 is a partial perspective view of one form of high-lift vents in the wing;

FIGURE 5 is a perspective view of another form of vent provided with provision for reversing the air flow direction;

FIGURE 6 is a view in section through a vertical plane on the line VI—VI of FIGURE 1, and FIGURE 7 is a diagrammatic view, in partial section through a longitudinal vertical plane, of another form of the invention.

In the embodiment shown in FIGS. 1 and 2, a wing having the general reference 2 is formed by an assembly of panels 4 of fabric or some similar thin flexible material. The panels 4 are secured to a rigid peripheral frame 6, for instance, of light alloy, which is preferably reinforced by cross-members 8. At least some of the panels, such as 10, are secured on only three sides to the adjacent panels or to wing reinforcement elements 12 so that rear edge 14 of the panels 10 is free to co-operate with the edge of the adjacent panel to bound a vent providing communication between the top and bottom of the wing. As arrows 16 in FIG. 2 show, when the aircraft moves relatively to the air, air is blown through the vent at high speed to the rear and substantially at a tangent to the top of the bearing surface. Vents of this kind have of course considerable high-lift and driving action by virtue of the air flow which they produce on either side of the wing.

Some vents, such as 18, can have a convergent section like a venturi entry in order to accelerate the air flow. As shown in FIG. 1, if the aircraft has only one engine, the vents above described are preferably grouped near the wing axis rather than in the lateral parts of the wing.

Preferably, the engine of an aircraft according to the invention is a shrouded screw engine, namely, a screw 20 driven by an engine 22 is disposed in a central portion 24 of a duct or shrouding 26. Air drawn in at the front thereof passes therethrough to be delivered at the rear at high speed. The central portion 24 is prolonged in the forward direction by a flared air intake 28 which is flat and very wide, which opens above the top of the bearing surface and in alignment with such surface.

When the screw 20 rotates, it draws in a flat and very wide air stream which is indicated by arrows 30 in FIGS. 1 and 2 and which produces a high-lift air flow through the vents 10, 18 even at low aircraft speeds. The aircraft can therefore take off at reduced speeds and with very short runs. A cabin or the like 32 can be slung on struts 34 below the wing 2 and can be either of the land type as in FIG. 2, or of the amphibious type, as in FIG. 3.

Of course, a number of engines can be provided, and in which event there will be a number of ducts or shroudings disposed symmetrically of the aircraft longitudinal axis, if it is required to have considerable or fractionated power available.

The wing shown in FIGS. 1 and 3 is thin and light and is, for instance, of fabric, but the invention also covers a structured or thick wing such as is shown in longitudinal section in FIG. 7. In such an event, vents 10' can have a large transverse dimension to form high-lift vents. Those of such vents such as 10" which are nearest air intake 28 of shrouding 26 can have a length at least equal to the width of the air intake.

The high-lift action of the vents in the present aircraft is increased considerably by the stream of air aspirated along the top of the bearing surface, and thus the bearing surface required for a given total load can be less than in conventional aircraft with a consequent reduction in initial costs.

Preferably, rearward part 36 of the shrouding 26 is convergent in order to accelerate the air stream delivered by the screw 20. Preferably, vertical control surfaces 38 and horizontal control surfaces 40 are disposed in such air stream and remain fully effective in the low-speed flight manoeuvring which an aircraft according to the invention can perform.

A delta wing is shown in FIG. 1 but any other form of wing can of course be used. As well as "blown" control surfaces 38, 40, the wing has conventional aerodynamic control surfaces in the form of lateral ailerons 42, 42′ and elevators 44, 44′ pivoted to the rigid frame 6. Preferably, and as shown in FIGS. 1 and 6, the elevator surfaces 44, 44′ are disposed behind a wing panel 46, 46′ having a free edge 48, 48′ for bounding a vent blowing air in a direction 50 (FIG. 6) on the elevators to increase their effectiveness. The moving surface of the various control surface elements can also be formed with vents 52, 52′ for the same purpose, with such vents being rigid so as not to be deformed the wrong way when the aircraft is in a nose-up position, and the moving surface can also comprise a compensating flap 54, 54′ which, when the elevators are in the lowered position shown in FIG. 6, partly closes the exit of the vent 48, 48′ to ultimately "seat" the aircraft during the final phase of landing by reduction of the lift.

The present aircraft also is provided with horizontal control surfaces 56, 56′ associated with fixed surfaces or fins 58, 58′, and the fins and the horizontal control surfaces preferably are mounted at an inclination on the sides of the fuselage in order that, contrary to what happens in conventional aircraft, may continue to be effective and in fact be even more effective when the aircraft is in nose-up positions.

In a marine or amphibious aircraft such as is shown in FIG. 3, the bottom end of the fins 58, 58′ can be secured to the sides of hull 32, while in land craft such as is shown in FIG. 2, the bottom end of the fins 58, 58′ can be connected to the hull by substantially horizontal elements 60 which can have a considerable fixed lifting surface.

Preferably, the driving element used in an aircraft according to the invention is a variable-pitch screw 20 in which each blade has a variable-incidence flap, such as is described in the applicant's French patent application 951,186 of July 31, 1947 entitled "Drive Elements." Of course, the aircraft can, without departing from the scope of the invention, have a number of air-aspirating drive devices each of which is disposed on a part of a single bearing surface or on a number of separate bearing surfaces.

In the foregoing, reference has been made in connection with FIGS. 1 and 2 to a thin bearing surface of panels of fabric or a similar thin flexible material, and in FIG. 7 to a thicker bearing surface. The bearing surface can, however, be wholly or partly of a thin but rigid material such as reinforced plastics or light alloys.

The aircraft wing, as well as being formed with vents, as 10, 18, which experience the air suction of the drive device and one embodiment of which is shown in FIG. 4, and with vents, as 48, 48′ which co-operate with the elevators 44, 44′, can be formed with other high-lift vents, including variable cross-section vents, as 62, 62′, which can be closed to varying extents by means of control cables 64 to vary wing lift, and with vents 66, 66′ which enable the air flow direction to be reversed. One such vent 66 is shown in FIG. 5. As will be apparent, either end of the vent 66 can be selectively closed by a flap 68, 68′ operated by cables (not shown). Hence, when the rear flap 68′ is closed and the front flap 68 opened, the direction of air flow through the vent is reversed, inter alia in a nose-up attitude at landing to reduce lift and provide braking.

This invention is not to be confined to any strict conformity to the showings in the drawings but changes or modifications may be made therein so long as such changes or modifications mark no material departure from the spirit and scope of the appended claims.

What is claimed is:

1. An aircraft having at least one fixed bearing surface having a topside and an underside, a front facing duct having an entrance and a rearwrdly directed exit, at least one engine which draws in air at the entrance of the front-facing duct and which delivers air at high speed through the rearwardly directed exit of the duct, at least part of the bearing surface being formed with high-lift vents having inlets and outlets, the inlet of the vent opening on to the underside of the bearing surface and the outlet opening on to the topside of the bearing surface and being directed substantially rearwardly of the aircraft, and the entrance of the duct being disposed above the topside of the bearing surface and substantially at the level of such topside behind the vent outlets, so that when the engine is in operation its intake of air produces a forced air flow through the vents.

2. The aircraft according to claim 1, wherein the duct is defined by a shroud having a cylindrical central portion in which at least one screw driven by an engine rotates, the central portion being connected to a front flattened part which extends to a shallow and very wide air intake at the level of the topside of the bearing surface and to the rear of the vent outlets.

3. The aircraft according to claim 1, wherein the duct is defined by a shroud having a cylindrical central portion in which at least one screw driven by an engine rotates, the central portion being connected to a front flattened part which extends to a shallow and very wide air intake at the level of the topside of the bearing surface and to the rear of the vent outlets, and said central portion of the shrouding being prolonged by a convergent rearward part.

4. The aircraft according to claim 1, wherein that portion of the bearing surface which is formed with the high-lift vents is defined by assembled panels of a thin flexible material, with some of the panels having a free edge opposite a free edge of an adjacent panel to bound a rearwardly directed vent outlet between the free edges.

5. The aircraft according to claim 1, wherein the duct is defined by a shroud having a cylindrical central portion in which at least one screw driven by an engine rotates, the central portion being connected to a front flattened part which extends to a shallow and very wide air intake at the level of the topside of the bearing surface and to the rear of the vent outlets, said central portion of the shrouding being prolonged by a convergent rearward part, and vertical and horizontal control surfaces being so disposed at the exit of the convergent rearward part of the shrouding as to experience the delivery of air from the engine.

6. The aircraft according to claim 1, wherein the bearing surface, in addition to said high-lift vents, is provided with other vents disposed outside the intake air stream of the engine and which experience only the relative wind arising out of the speed of aircraft movement, and means for controlling the air flow passage cross-section for some of said other vents.

7. An aircraft comprising a sustaining element having upper and lower surfaces and leading and trailing edges, a fore and aft extending tubular body supported by said sustaining element, the fore end of said body providing a forward facing air intake opening at the upper surface of said sustaining element between said leading and trailing edges thereof, and the rear of said body providing a rearward facing discharge opening, a plurality of air nozzle means in said sustaining element for directing the air from the lower surface of the sustaining element to at least an upper surface region thereof situated between said leading edge of the sustaining element and said intake opening of the tubular body, said nozzle means deflecting the air streams directed to said upper surface in a rearward direction for producing a combined lift and propulsion effect at said upper surface, and power operated propulsion means disposed in said tubular body for drawing air from said upper surface region through said intake opening.

8. The aircraft according to claim 7 in which said sustaining element is of concavo-convex form.

References Cited

UNITED STATES PATENTS

| 1,104,242 | 7/1914 | Bonnot et al. | 244—35 |
| 2,390,859 | 12/1945 | Warner | 244—15 |

FOREIGN PATENTS

| 131,738 | 9/1919 | Great Britain. |
| 349,255 | 6/1937 | Italy. |

MILTON BUCHLER, *Primary Examiner.*

T. MAJOR, *Assistant Examiner.*